(12) United States Patent
Perez Fernandez et al.

(10) Patent No.: US 10,960,584 B2
(45) Date of Patent: Mar. 30, 2021

(54) VEHICLE INTERIOR HANDLE WITH ENCAPSULATED CORE AND CORRESPONDING METHOD OF MANUFACTURE

(71) Applicant: GM GLOBAL TECHNOLOGY OPERATIONS LLC, Detroit, MI (US)

(72) Inventors: Juan Edgar Perez Fernandez, Mexico City (MX); Tito Perez Guizar, Toluca (MX); Luis Miguel Del Pozo Gonzalez, Puebla (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 15/911,877

(22) Filed: Mar. 5, 2018

(65) Prior Publication Data

US 2019/0270229 A1   Sep. 5, 2019

(51) Int. Cl.
| | | |
|---|---|---|
| *B29C 45/14* | (2006.01) | |
| *B29C 45/04* | (2006.01) | |
| *B60N 3/02* | (2006.01) | |
| B29K 277/00 | (2006.01) | |
| B29L 31/30 | (2006.01) | |
| B29K 101/12 | (2006.01) | |
| B29K 311/10 | (2006.01) | |
| B29K 677/00 | (2006.01) | |
| B29K 711/10 | (2006.01) | |

(52) U.S. Cl.
CPC .... *B29C 45/14065* (2013.01); *B29C 45/0408* (2013.01); *B29C 45/14819* (2013.01); *B60N 3/02* (2013.01); *B29C 2045/1445* (2013.01); *B29C 2045/14155* (2013.01); *B29K 2101/12* (2013.01); *B29K 2277/00* (2013.01); *B29K 2311/10* (2013.01); *B29K 2677/00* (2013.01); *B29K 2711/10* (2013.01); *B29L 2031/3029* (2013.01)

(58) Field of Classification Search
CPC ........... B29C 45/0001; B29C 45/0005; B29C 45/14008; B29C 45/14065; B29C 45/14; B29C 45/0408; B29C 45/14819; B29C 2045/14155; B29C 2045/1445; B29K 2277/00; B29K 2677/00; B29L 2031/3029
USPC ......................................... 264/328.1, 331.19
See application file for complete search history.

(56) References Cited

U.S. PATENT DOCUMENTS

| | | | |
|---|---|---|---|
| 7,544,319 B2 * | 6/2009 | March ................. | H01Q 1/3241 264/328.1 |
| 2007/0087193 A1 * | 4/2007 | Lee ........................ | C08L 23/10 428/364 |

(Continued)

*Primary Examiner* — Jeffrey M Wollschlager
*Assistant Examiner* — Xue H Liu
(74) *Attorney, Agent, or Firm* — Lorenz & Kopf LLP (57) ABSTRACT

One general aspect includes a method of manufacturing a handle, the method including: providing a core element; providing a mold; strategically positioning the core element within the mold such that a formable material can be injected into the mold (when in a molten state) to operatively encapsulate the core element and such that the core element remains stationary while being operatively encapsulated by the formable material; and injecting the formable material (when in the molten state) into the mold to operatively encapsulate the core element and be formed, by the mold, into a handle configured to be joined to a window support pillar of a vehicle interior.

9 Claims, 7 Drawing Sheets

(56) References Cited

U.S. PATENT DOCUMENTS

2008/0246293 A1\* 10/2008 Fujiwara ............. E05B 17/0004
                                                                        296/1.02
2010/0132162 A1\* 6/2010 Gertig .................. B29C 45/006
                                                                        16/412

\* cited by examiner

VEHICLE INTERIOR HANDLE WITH ENCAPSULATED CORE AND CORRESPONDING METHOD OF MANUFACTURE

INTRODUCTION

Vehicle weight can be an issue. That said, lighter vehicles tend to be quicker and perform better. Weight reduction, moreover, has a direct correlation with vehicle mileage. Accordingly, it is desirable to reduce vehicle weight in an effort to achieve better performance, speed, and mileage.

SUMMARY

One general aspect includes an interior of a vehicle including: a pillar to support one or more vehicle windows, and a load bearing handle joined to the pillar, and a core element encapsulated in the body of the handle.

Implementations may include one or more of the following features. The vehicle interior where the handle body and the core element are made of a different material. The vehicle interior where the core element is made from a natural fiber material. The vehicle interior where the core element is a hollow cylinder and made from a polyamide. The vehicle interior where the cylinder includes an internal reinforcement section. The vehicle interior where the handle body is made from thermoplastic olefin. The vehicle interior where: the core element is centrally located within the handle body; and the core element and handle body have corresponding shapes.

One general aspect includes a method of manufacturing a handle, the method including: providing a core element; providing a mold; strategically positioning the core element within the mold such that a formable material can be injected into the mold (when in a molten state) to operatively encapsulate the core element and such that the core element remains stationary while being operatively encapsulated by the formable material; and injecting the formable material (when in the molten state) into the mold to operatively encapsulate the core element and be formed, by the mold, into a handle configured to be joined to a window support pillar of a vehicle interior.

Implementations may include one or more of the following features. The method of manufacturing a handle further including: after being injected into the mold, allowing the formable material to cool from the molten state to a solid state; and removing the handle with encapsulated core element from the mold. The method of manufacturing a handle where: the mold is configured to be operatively placed in an injection molding machine; the formable material is injected into the mold by the injection molding machine; and the core element is held in place in the mold through the application of vacuum suckage. The method of manufacturing a handle where the formable material is thermoplastic olefin. The method of manufacturing a handle where the core element is made from a natural fiber material. The method of manufacturing a handle where the core element includes one or more air compartments. The method of manufacturing a handle where the core element is a hollow cylinder and made from a polyamide. The method of manufacturing a handle where the core element includes an internal reinforcement section.

One general aspect includes a method of manufacturing a handle, the method including: providing a core element; providing a vertically-oriented mold including a mold cavity, the mold located in an injection molding machine and adapted to allow suckage to occur at one or more locations in the mold; strategically placing the core element in the mold such that a thermoplastic olefin (TPO) can be injected into the mold cavity (when in a molten state) by the injection molding machine so as to operatively encapsulate the core element; allowing the core element to be operatively held in place while in the mold via a vacuum such that the core element will remain substantially stationary while the TPO operatively encapsulates the core element; injecting the TPO (when in the molten state) into the mold to operatively encapsulate the core element and be formed into a handle configured to be joined to a window support pillar of a vehicle interior; allowing the TPO to cool from the molten state to a solid state while in the mold; and removing the handle including the encapsulated core element from the mold.

Implementations may include one or more of the following features. The method of manufacturing a handle where the core element is made from a natural fiber material. The method of manufacturing a handle where the core element is a hollow cylinder and made from a polyamide. The method of manufacturing a handle where the core element includes an internal reinforcement section.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
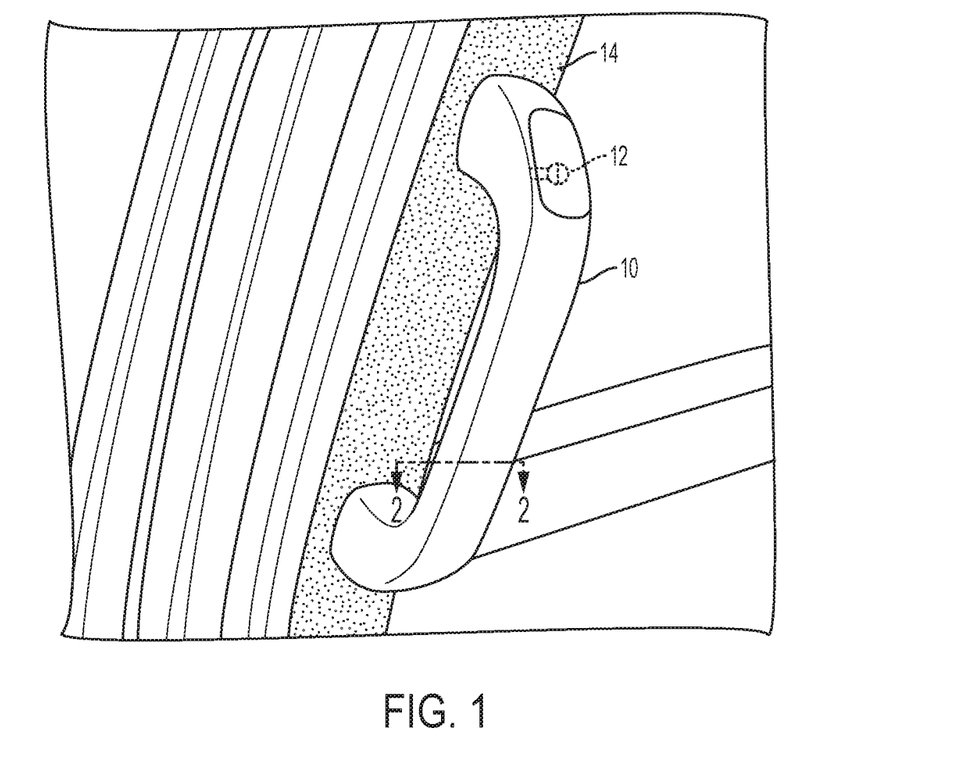
FIG. 1 is a perspective view of an exemplary pull handle in an exemplary vehicle interior environment according to an aspect.

As shown in FIG. 1, a pull handle adapted to join to the interior side of a vehicle window support pillar has been generally indicated by reference number 10. Pull handle 10 is designed to enable an occupant to maintain balance and/or lessen fatigue while getting into or out of the vehicle. Specifically, handle 10 can allow the occupant to hold at least some of their weight during ingress/egress maneuvering, or provide them something to grab onto to reduce the likelihood of accident. In order to accomplish this effect, handle 10 can be joined via screws/bolts 12 along some point on the interior side of pillar 14 that generally supports the vehicle's window area or greenhouse.

Figure 2:
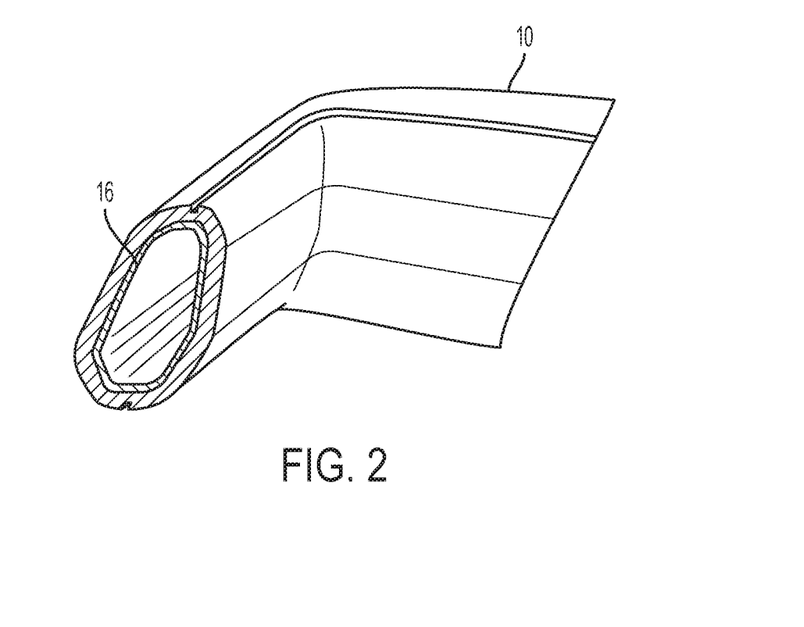
FIG. 2 is a partial sectional view of an exemplary pull handle of FIG. 1 taken at line 2-2 of FIG. 1.
Figure 3:
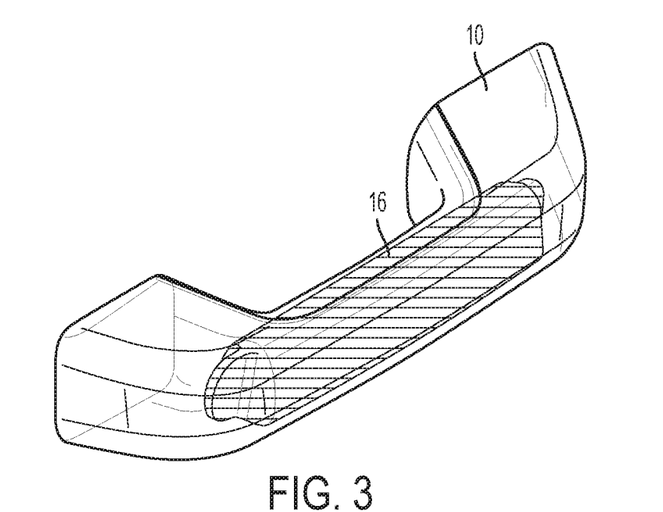
FIG. 3 is a perspective view of an exemplary core element within an exemplary pull handle.

As shown in FIGS. 2 and 3, handle 10 includes a centrally located and fully encapsulated light-weight, low-density, hollow, elongated core element 16 to give the handle 10 a cross section of two different materials (i.e., a bi-material cross section). This embodiment of core element 16 is generally manufactured from a material which can significantly reduce the weight of a handle 10 having a body made from a Class A polymer, for example, thermoplastic olefin (TPO). In addition to TPO, the material of core element 16 would also reduce the weight of handles 10 having a body made from other known material/material composites. As a result, conducting a side-by-side comparison, handles having the encapsulated core element 16 will weigh approximately 300 grams less than those solid, single-material handles 10 that do not include the encapsulated core element 16.

Figure 4:
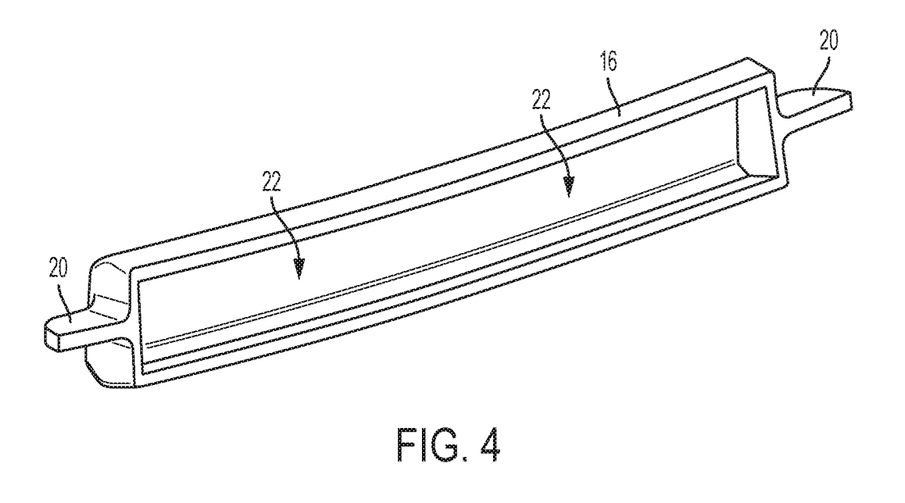
FIG. 4 is a perspective sectional view of an exemplary core element.

As represented in FIG. 4, core element 16 may be made from a polyamide such as, for example, nylon (ultramid) and include an air compartment 22 that generally creates a hollow, cylindrical center for core element 16. The cylindrical shaped core element 16 can also be constructed through a commonly known high-temperature blow molding manufacturing process, for example, extrusion blow molding, injection blow molding, or injection stretch blow molding. Two flattened connection sections 20 can moreover be integrated onto this embodiment of core element 16. The connection sections 20 are designed and positioned to allow the core element 16 to remain in place while being over molded by the Class A polymer that makes up the body of handle 10, discussed below. With reference back to FIG. 3, embodiments of core element 16 may have an elongated shape which substantially corresponds with the shape the gripping part of handle 10. This elongated shape allows for a substantial amount of the handle body 10 to include the encapsulated core element 16 within it as well as facilitate weight reduction of the handle 10. Moreover, due to this embodiment of core element 16 having air pocket 22, when compared to coreless handles, the cross-sectional density of handle 10 is substantially lower (i.e., since the density of the air in the center of hollow core element 16 is 0.001 g/cm$^3$). A cross-section of handle 10, a can be understood with reference to FIG. 2, will reveal that an exemplary handle 10 can have a core element 16 including a wall which surrounds air compartment 22 being 2.0-2.5 mm thick and being surrounded by between 2.0-2.5 mm of the TPO material which makes up the body of handle 10.

Moreover, as can be understood with review of the table below, handles incorporating this hollow polyamide embodiment of core element 16 generally have an improved load capacity with only a slight geometric compensation (i.e., an 8% O.D. of 2 mm).

|  | SOLID HANDLE (Ø25 mm O.D.) | CORED HANDLE (Ø27 mm O.D./18 mm I.D.) |
|---|---|---|
| Cross Section | 91 mm$^2$ | 304 mm$^2$ |
| Moment of Inertia | 19140 mm$^4$ | 20934 mm$^4$ |
| Bending Load Capacity | 100% | 109% |

Figure 5:
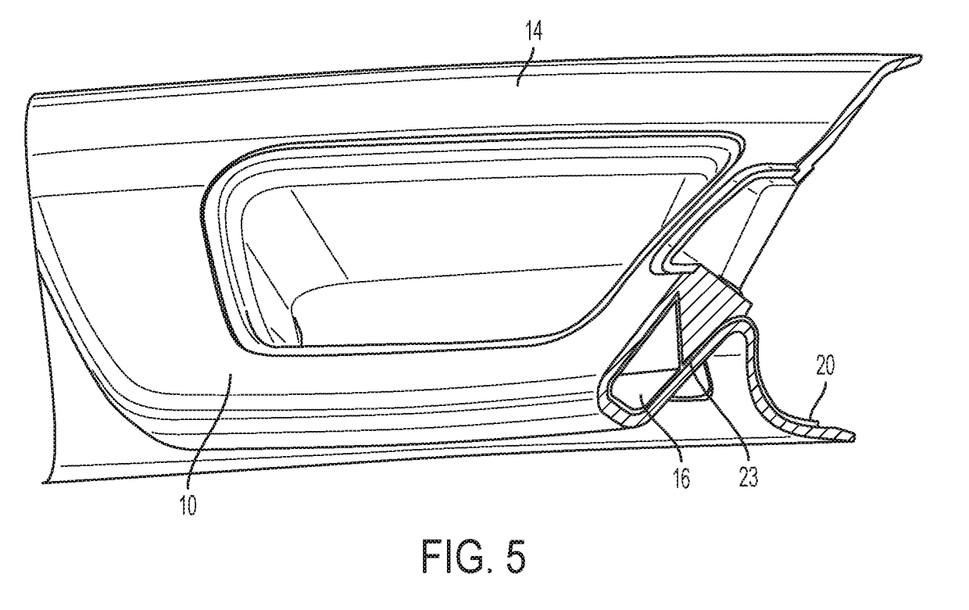
FIG. 5 is a perspective sectional view of an exemplary core element in an exemplary pull handle.

Another embodiment of core element 16 may be included in a handle 10 that is intermolded with the interior pillar 14, as represented in FIG. 5. This embodiment of core element 16 can be manufactured from a preformed natural fiber material composite. Thus, the natural fiber composite will be preformed to fit the shape of the corresponding features of the handle-pillar combination in which it will be encapsulated. As shown, moreover, once formed, similar to the previously discussed embodiment, the natural fiber core element 16 may be hollow due to the inclusion of air compartment 22 so as to further reduce the overall weight of handle 10. This embodiment of core element 16 can include a sidewall which surrounds air compartment 22 being 1.2 mm thick and being surrounded by between 2.5-5 mm of the TPO material which makes up the body of handle 10. Furthermore, natural fiber composites are known to be inherently light with regard to their strength and generally made of fibers produced by plants, animals, and/or geological processes. Natural fiber composites may, for example, be a polymer matrix embedded with high-strength jute, oil palm, sisal, kenaf, or flax fibers or some combination thereof. These natural fiber cores are also less dense than the Class A polymer that makes up rest of the handle body (natural fiber being 0.873 g/cm$^3$, whereas TPO is 1.030 g/cm$^3$). Similar to the above discussed embodiment, handles 10 encapsulating this embodiment of core element 16 will weigh approximately 300 grams less than those solid, single material handles 10 which do not include core element 16.

Figure 6:
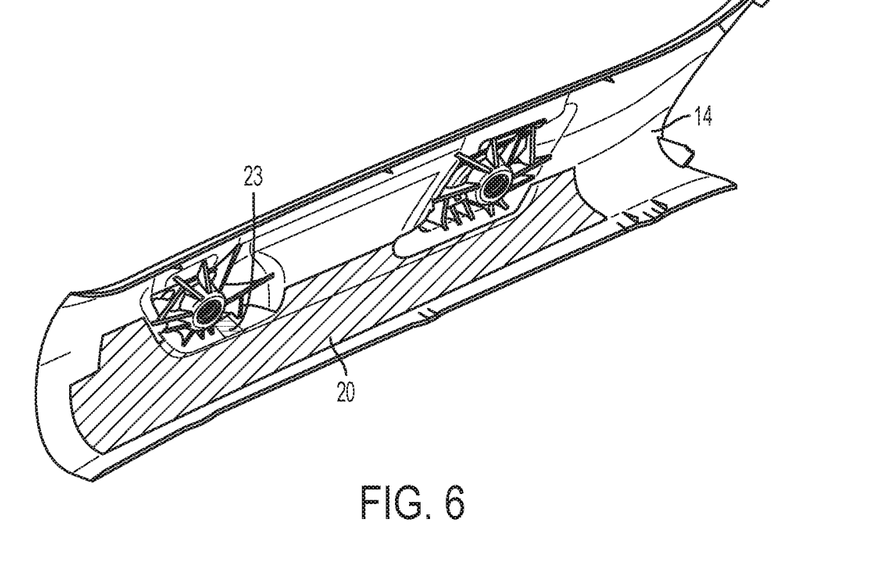
FIG. 6 is a perspective environmental view of an aspect of the exemplary core element of FIG. 5.
Figure 7:
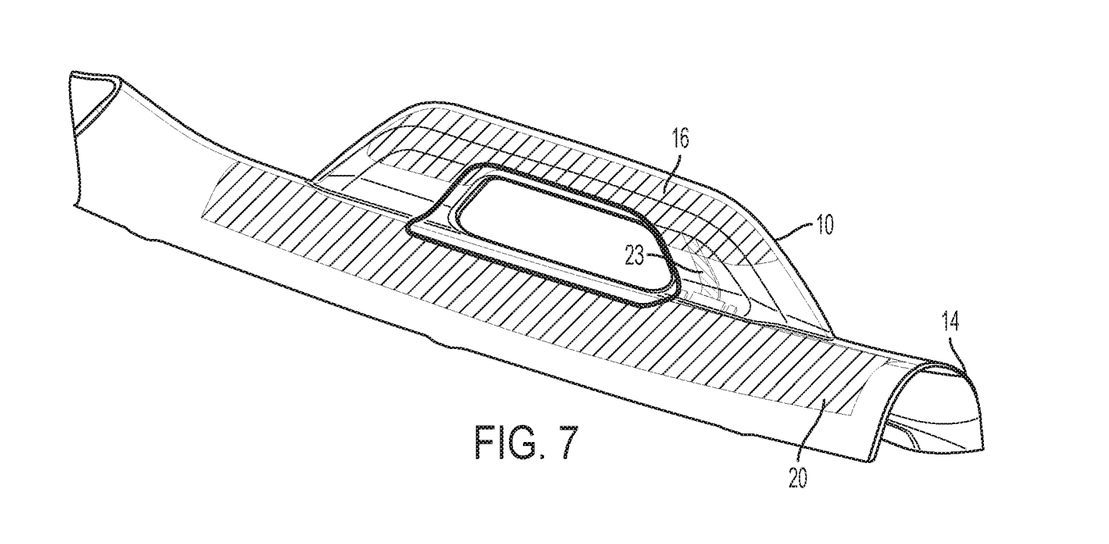
FIG. 7 is a perspective view of an exemplary core element within an exemplary pull handle.
Figure 8:
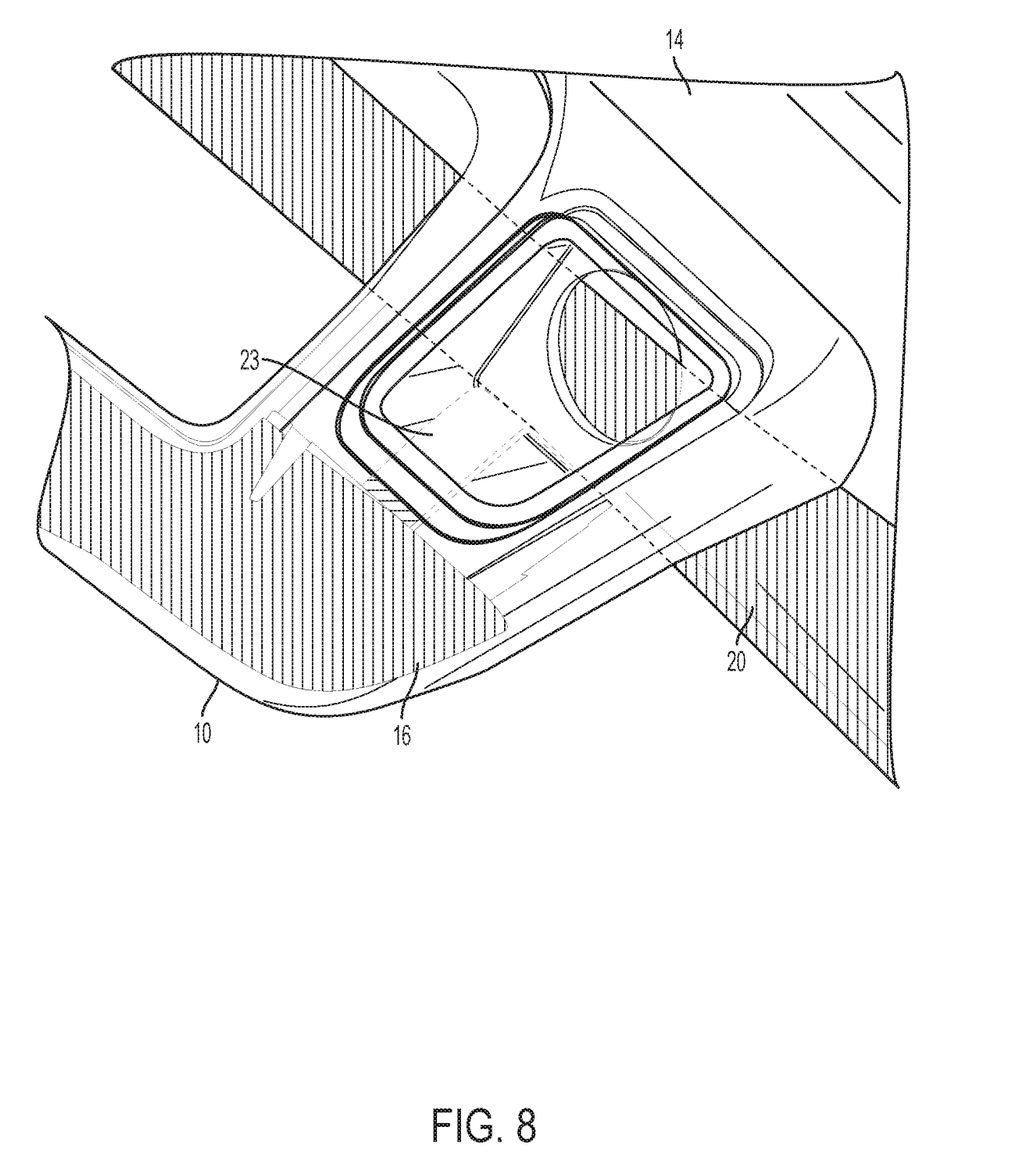
FIG. 8 is a perspective view of an aspect of the exemplary core element.

With further reference to FIGS. 6 through 8, the connection section 20 is separate from the rest of core element 16 and connected by a flange 23. In this embodiment, connection section 20 runs parallel to core element 16 and is located in the portion of the molded part that makes up the pillar 14, while core element 16 remains in handle 10. It should be understood, connection section 20 can be of dimensions that conform to the dimensions of pillar 14. Thus, pillars 14 of differing sizes and shapes may each encompass a connection section 20 designed to meet such sizes and shapes.

Figure 9:
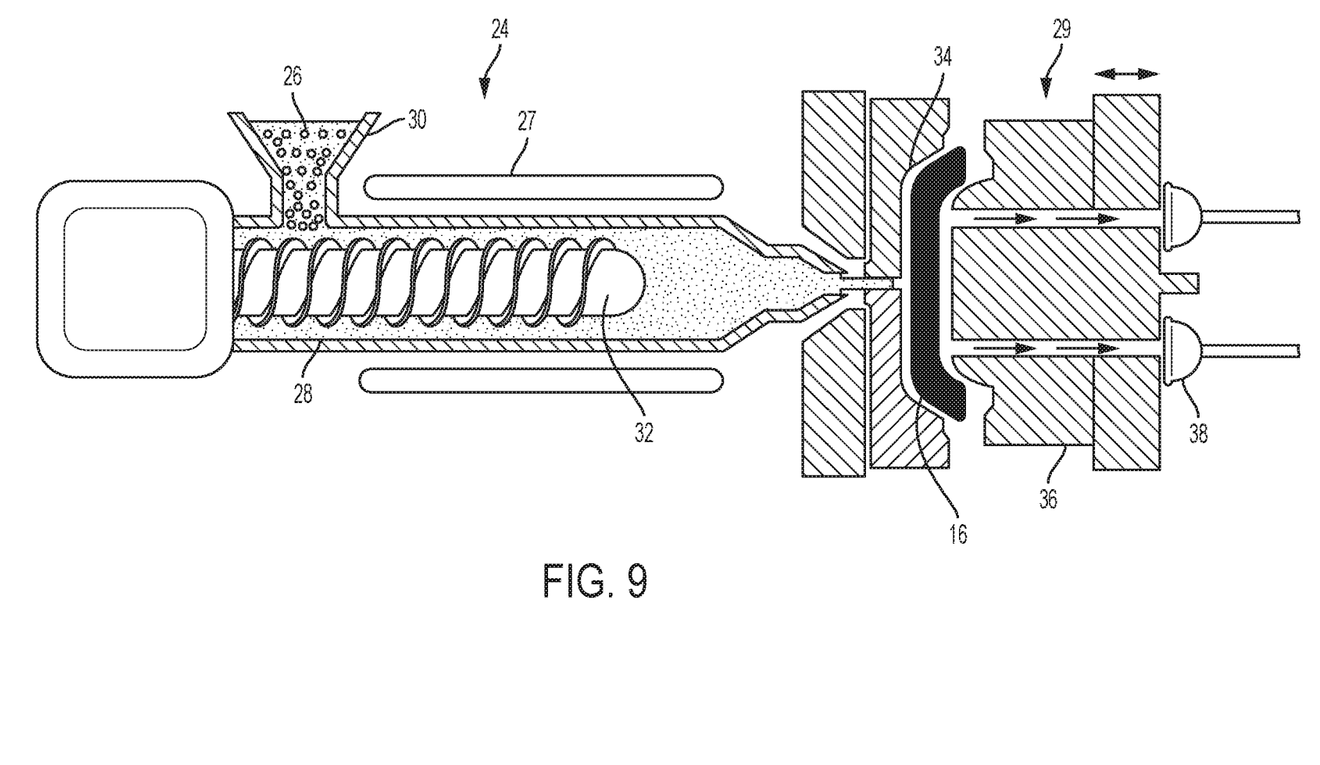
FIG. 9 is a block diagram of an exemplary injection molding machine for manufacturing the exemplary pull handle of FIG. 1.
Figure 10:
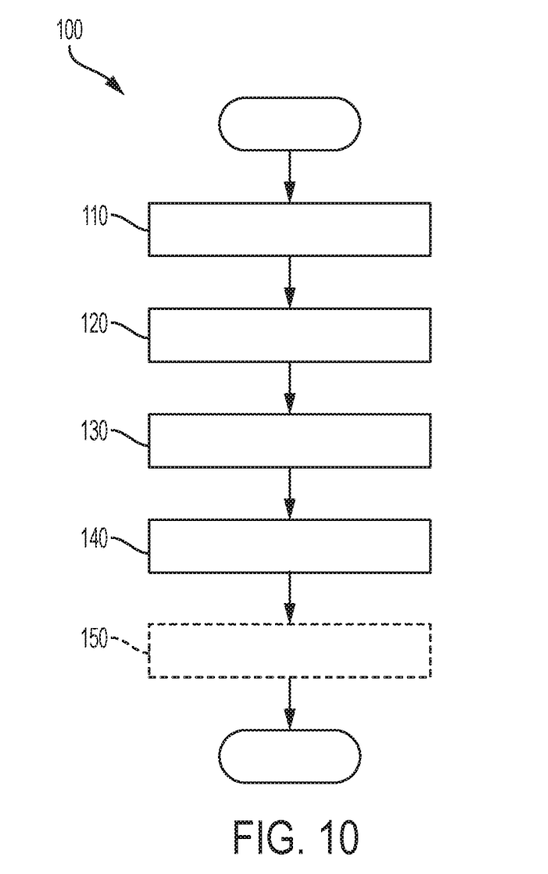
FIG. 10 is a flow of an exemplary method of manufacture of an exemplary pull handle.

As shown in FIG. 9, handle 10 may be manufactured through an injection molding process via an exemplary injection molding machine 24. As skilled artisans will generally understand, injection molding machine 24 can enable a large number of handles 10 to be made with high quality, great accuracy, and at a rapid pace. In addition, injection molding handle 10 also ensures the core element 16 will consistently be over molded at the same location within the handle body and can be accurately placed to ensure the integrity of the completed handle 10 meets all pre-established requirements.

During the injection molding process, Class A polymer granules 26 (TPO granules) will be melted by heating elements 27 until becoming a formable molten state within a barrel 28 and injected under pressure to fill a tool steel/stainless steel mold 29. A hopper 30 and screw-type plunger 32 may work in conjunction to force the molten polymer into a mold cavity 34 and the polymer may cool into a solid state while in cavity 34 to produce the desired handle 10. Once the polymer molding has cooled sufficiently to harden into a solid, mold 29 will open by separating cavity 34 from a mold core 36, to release a completed handle 10. The injection molding process will then repeat.

Prior to the molten polymer being injected into mold 29, core element 16 may be strategically positioned in the mold 29 to be properly encapsulated by the polymer. Suckage may be implemented within the vertically-oriented mold 29 by the application of a vacuum 38. This suckage from vacuum 38 ensures that the core element 16 remains stationary while being over molded by the formable molten polymer material. One or more guide pilots (not shown) can also be installed on mold core 36 to assist with the strategic positioning of core element 16. Skilled artisans will also see that mold 29 can also be embodied to be horizontally oriented and implement guide pilots in conjunction with the application of gravity to strategically position core element 16 within core 36 and hold the core in place.

With reference to FIG. 7, there can be seen an exemplary flow of a method 100 to manufacture a handle having an encapsulated core. Wherein the core is of a material that is different than the material of the remaining bulk of the handle body and which is designed to significantly reduce the weight of the finished handle. In a first step 110, a core element 16 and injection molding machine 24 are each provided to an injection molding machine operator (not shown). In step 120, the machine operator will strategically place core element 16 in mold 29. As discussed above, proper placement will allow the formable molten polymer material to be injected into the mold cavity 34 and fully encapsulate the core element 16 within the material (i.e., in the handle 10 alone or in a handle-and-pillar combination). In step 130, the machine operator will activate vacuum 38 to create suckage to occur at appropriate locations within mold 29 and hold core element 16 in place. For example, when core element 16 is embodied as a hollow polyamide cylinder, suckage may occur in the mold at locations corresponding to the flattened connection sections 20 so as to ensure the core element 16 will remain stationary during normal operation of injection molding machine 24. In step 140, the machine operator will operate injection molding machine 24 to inject the molten polymer into mold cavity 34 and allow the molten polymer to envelop core element 16 and be shaped into handle 10. In optional step 150, the machine operator will allow the polymer to cool into a solid state while in mold 29. The application of coolant systems in mold 29, which can implement cold water or oil, may be used in this step to speed up the hardening process of the formed polymer. Moreover, in this step, the machine operator may separate mold cavity 34 from core 36 and remove the manufactured handle from the injection molding machine 24. When removed from the core 36, the handle should be properly shaped to be joined to a window support pillar of a vehicle interior and the core element 16 should be located within the handle to be hermetically sealed such that no portions of core element 16 would be exposed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method of manufacturing a handle, the method comprising: providing a core element comprising a plurality of connection sections, wherein the connection sections are configured to enable the core element to remain in place during handle manufacture;

providing a mold;

strategically positioning the core element within the mold such that a formable material can be injected into the mold when in a molten state, to operatively encapsulate the core element and such that the core element remains stationary while being operatively encapsulated by the formable material;

creating suckage, via a vacuum, at each connection section of the plurality of connection sections to ensure the core element will remain stationary during handle manufacture; and injecting the formable material, when in a molten state, into the mold to operatively encapsulate the core element and be formed, by the mold, into a handle configured to be joined to a window support pillar of a vehicle interior, wherein the core element having a lower density than the formable material.

2. The method of manufacturing a handle of claim 1, further comprising:

after being injected into the mold, allowing the formable material to cool from the molten state to a solid state; and removing the handle with encapsulated core element from the mold.

3. The method of manufacturing a handle of claim 1, wherein the formable material is thermoplastic olefin.

4. The method of manufacturing a handle of claim 1, wherein the core element is made from a natural fiber material.

5. The method of manufacturing a handle of claim 4, wherein the core element comprises one or more air compartments.

6. The method of manufacturing a handle of claim 1, wherein the core element is a hollow cylinder and made from a polyamide.

7. A method of manufacturing a handle, the method comprising: providing a core element comprising a plurality of connection sections, wherein the connection sections are configured to enable the core element to remain in place during handle manufacture;

providing a vertically-oriented mold comprising a mold cavity, the mold located in an injection molding machine and adapted to allow suckage to occur at one or more locations in the mold;

strategically placing the core element in the mold such that a thermoplastic olefin (TPO) can be injected into the mold cavity, when in a molten state, by the injection molding machine so as to operatively encapsulate the core element;

creating suckage, via a vacuum, at each connection section of the plurality of connection sections;

allowing the core element to be operatively held in place while in the mold via the vacuum suckage such that the core element will remain stationary while the TPO operatively encapsulates the core element;

injecting the TPO, when in a molten state, into the mold to operatively encapsulate the core element and be formed into a handle configured to be joined to a window support pillar of a vehicle interior, wherein the core element having a lower density than the TPO;

allowing the TPO to cool from the molten state to a solid state while in the mold;

and removing the handle comprising the encapsulated core element from the mold.

8. The method of manufacturing a handle of claim 7, wherein the core element is made from a natural fiber material and comprises an air pocket.

9. The method of manufacturing a handle of claim 7, wherein the core element is made from a polyamide and comprises an air pocket.

* * * * *